March 25, 1930.  E. HARMES  1,752,175
MECHANISM FOR FORMING AND HANDLING MOLDS
Filed Oct. 27, 1926  4 Sheets-Sheet 1
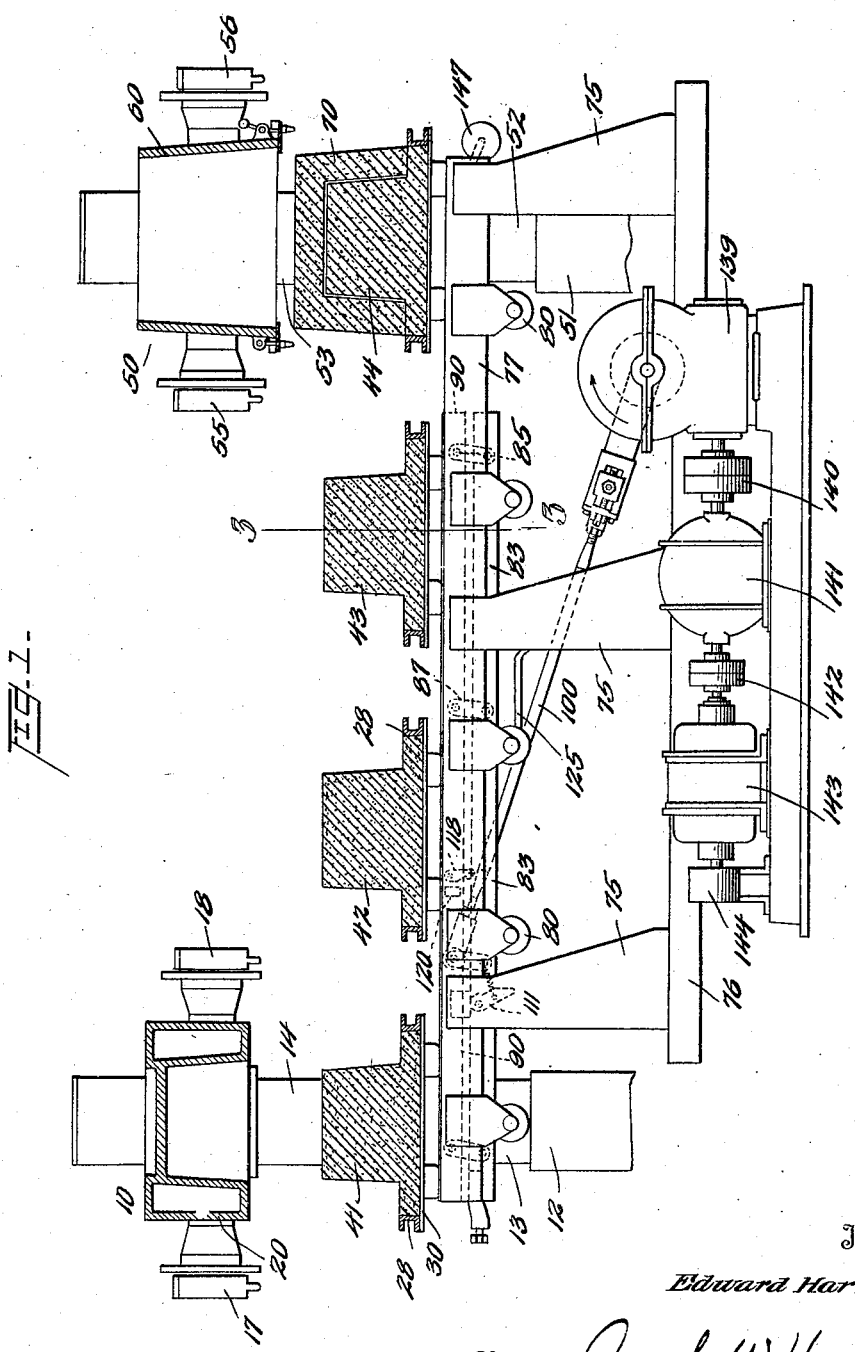
Inventor
Edward Harmes
By Joseph W. Hazell
Attorney

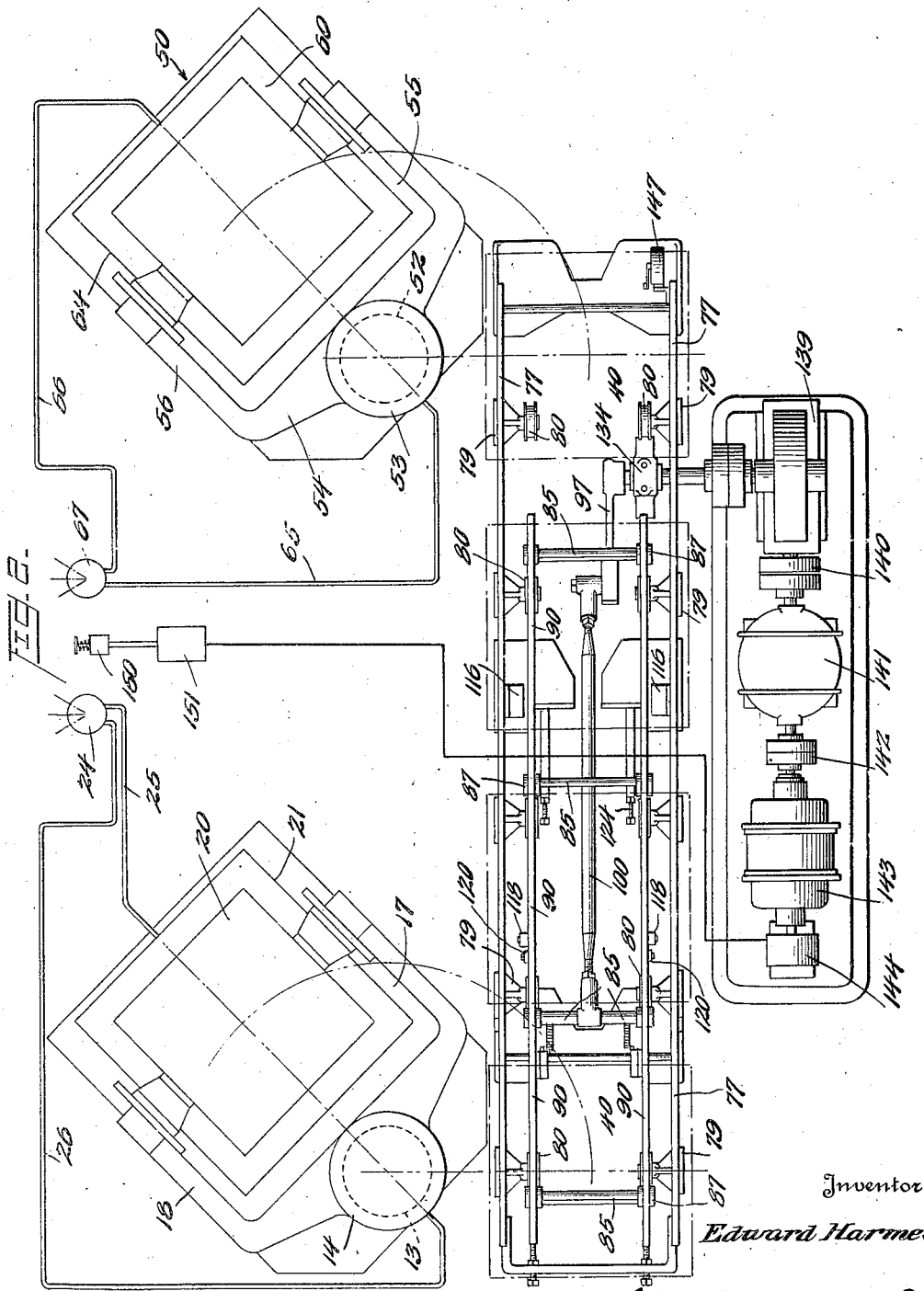

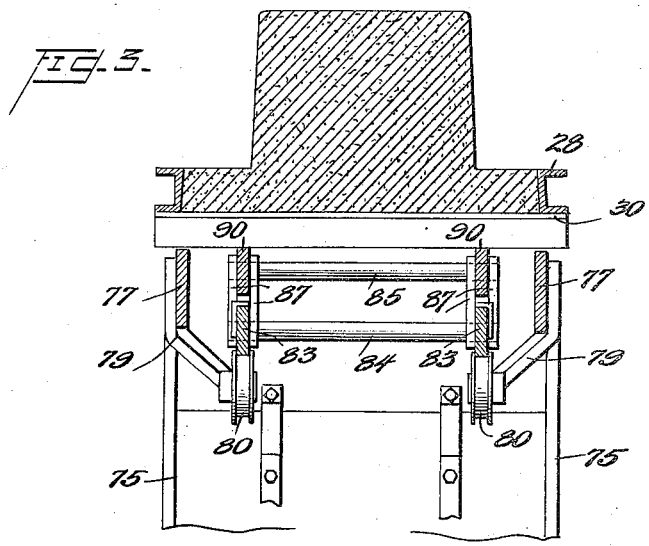
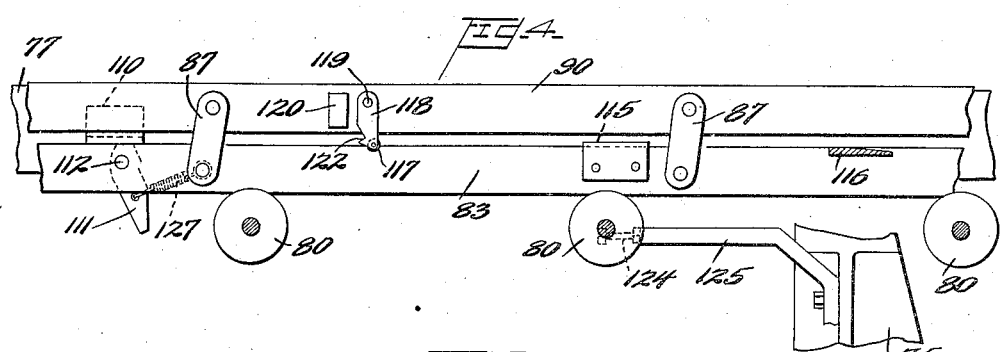
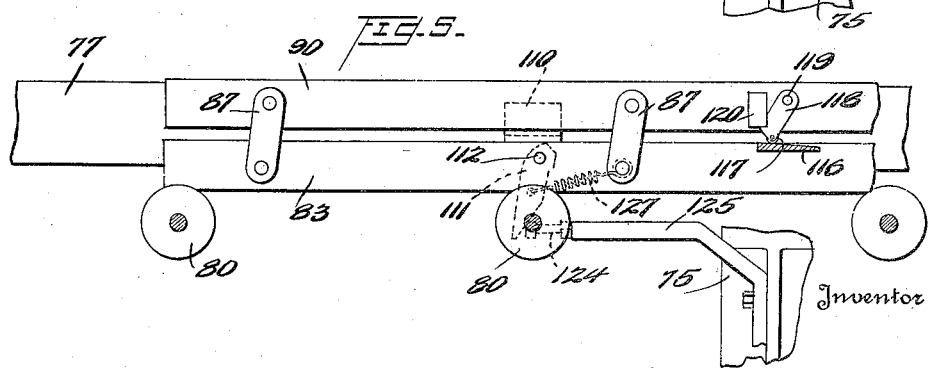

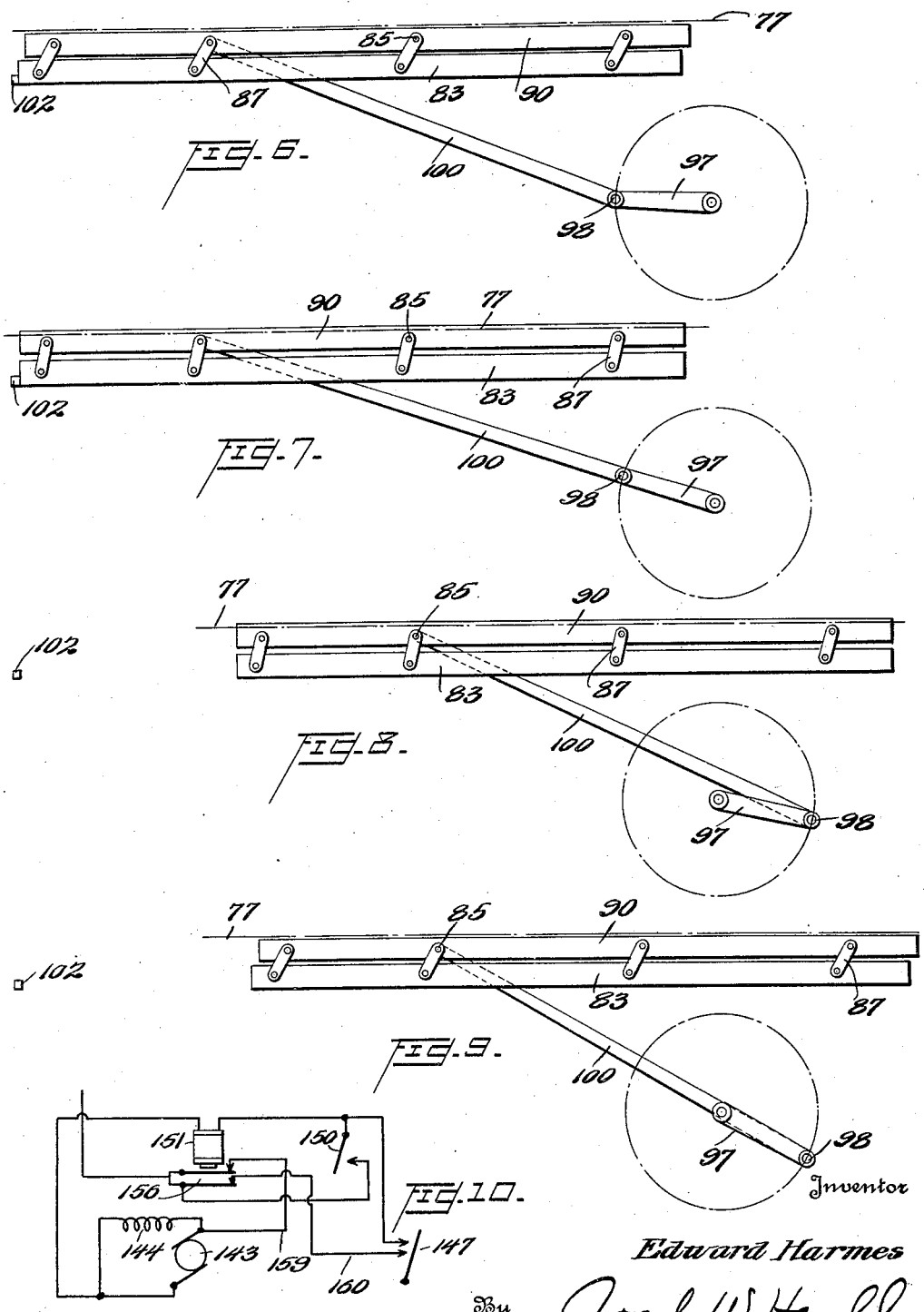

Patented Mar. 25, 1930

1,752,175

UNITED STATES PATENT OFFICE

EDWARD HARMES, OF WILKINSBURG, PENNSYLVANIA, ASSIGNOR TO NEW PROCESS MULTI-CASTINGS COMPANY, A CORPORATION OF NEW JERSEY

MECHANISM FOR FORMING AND HANDLING MOLDS

Application filed October 27, 1926. Serial No. 144,515.

The present invention relates to foundry mold forming and handling mechanism.

An object of the invention is to provide apparatus for performing a method of producing and handling completed molds ready for pouring which can be carried out continuously and accurately and also with great rapidity.

Another object of the invention is to provide apparatus for carrying out a process of forming and handling molds which produces a continuous supply of completed molds assembled with perfect accuracy ready for pouring.

A further object is to provide assembling and transfer means movable intermittently and which, when stationary, receives a drag mold at one point, and has a cope mold assembled on a drag mold at another point, and which, when in motion, carries a plurality of molds to be assembled.

A further object is to provide means and mechanism for carrying out the foregoing objects which include spaced drag and cope forming devices, with an assembling and transfer table connecting the two.

A further object of the invention is to provide such a mechanism in which the cope part of the flask forms a permanent part of the machine and need not be removed therefrom during the production of as many molds as may be required, together with means embodied in the machine not only for accurately drawing both cope and drag patterns, but also for stripping the cope mold, after the mold has been closed.

A still further object is to provide, in connection with this mechanism, an assembling and transfer table capable of lifting and carrying a plurality of molds, and having a relatively small lifting and lowering movement together with a relatively great longitudinal movement, and so constructed that in lifting, carrying, and setting down the plurality of molds, the movements are sufficiently gradual, smooth and even so that the stripped molds are in no way jarred or otherwise injured.

Other and further objects of the invention will appear from the following description, taken in connection with the accompany drawings, which illustrate, by way of example, one preferred form of mechanism embodying the mechanism of the present invention and adapted to carry out the purposes thereof, but which are not to be taken as a definition of the limits thereof, reference being had to the appended claims for that purpose.

In the drawings:

Fig. 1 is a side elevation, partly in section, of one form of mechanism for carrying out the invention;

Fig. 2 is a top plan view of the parts shown in Fig. 1, but with the cope forming and drag forming portions of the mechanism in another position;

Fig. 3 is a sectional view taken on the line 3—3 of Fig. 1;

Fig. 4 is a fragmentary side elevation of the form of assembling and transfer table herein shown in one position of the parts thereof;

Fig. 5 is a similar view, showing the parts in different positions;

Figs. 6 to 9 inclusive are diagrammatic views in side elevation, illustrating successive positions of the parts of the assembling and transfer table herein shown;

Fig. 10 is a diagrammatic illustration of the transfer table operating and control circuit.

The mechanism of the present invention, broadly stated, includes means for forming a drag mold, and depositing the drag mold on an assembling table, means for forming a cope mold, drawing the cope mold pattern, depositing the cope mold with absolute precision on the drag mold and stripping the cope mold of its flask; together with means, such as the assembling and transfer table herein shown, for carrying away from the drag machine the successively formed series of drag molds and successively positioning them with absolute accuracy in position to be individually assembled each with a cope mold formed on the cope machine, by means of the cope machine.

Referring in detail to the drawings, a drag mold forming machine is indicated generally at 10 and may be constructed similar to the drag mold forming machine shown in my copending application Serial No. 142,540, filed October 19, 1926, and may include the annular flange 12 fixed to an appropriate base, in which is fixed the vertically extending piston member 13, received within the cylinder member 14 adapted to move vertically upwardly and downwardly on the stationary piston 13, being operated by compressed air or other fluid under pressure delivered to the expansible chamber within the cylinder. The lifting cylinder 14 is shown as being provided with a pair of parallel arms 17 and 18 pivotally supporting by its trunnions the drag pattern 20, which, in the lifted position of the cylinder 14, may be rolled over. The cylinder 14 is preferably rotatable on the piston 13 in accordance with the disclosure of my copending application above referred to, in order that the invention may be used in connection with the operating or jarring table 21 (see Fig. 2) by means of which the sand is packed in the drag pattern. A control valve 24, provided with any suitable air inlet pipe, is connected by pipe line 25 to the jarring table operating valve, and by pipe line 26 to the lifting and lowering cylinder 14. In operating the drag forming mechanism, a drag flask 28 is placed upon the drag pattern 20, both of which are at this time inverted, and the drag pattern 20 is resting on the jarring table 21. Sand is now introduced into the drag pattern and drag, and valve 24 is actuated to operate the jarring table 21. When the sand is sufficiently packed in the flask and pattern, a bottom board 30 is placed upon the drag, and cylinder 14 is raised by actuating valve 24 to lift the assembled drag and drag pattern above the jarring table 21. In this position, the parts are rolled over, the cylinder 14 is rotated on the stationary piston 13, as indicated in dotted lines in Fig. 2, for the purpose of bringing the parts in position to deposit the completed drag mold upon the assembly and transfer table indicated generally at 40. By actuating valve 24, the cylinder is now lowered upon piston 13, being guided accurately in this downward movement by a guide key on the inside of the cylinder 14 traveling in a guide groove provided in the adjacent piston 13, all as shown in my co-pending application hereinabove referred to. When the cylinder 14 is lowered, so that the bottom board rests upon the transfer table 40, the retaining hooks are moved to release the bottom board 30, and the cylinder 14 is moved upwardly, thereby drawing the pattern 20 off the drag mold 41, as shown in Fig. 1, and leaving the drag mold within the drag flask resting on the bottom board 30 on the transfer table.

The cope mold forming machine 50 is constructed preferably in accordance with the cope machine of my aforesaid copending application, and is provided on a suitable base with the annular flange 51, within which is fixed the piston 52, received within the vertically movable and rotatable cylinder 53. The cylinder 53 carries a yoke 54 provided with arms 55 and 56, in whose outer ends are rotatably received the trunnions of the cope flask 60. The cope flask 60, as well as the drag pattern 20, are not only rotatable within their supporting arms, but are also freely vertically movable therein during jarring. The cope jarring or operating table 64 has preferably provided on its top, in fixed relation therewith, the cope pattern, and the cope operating or jarring table is actuated by compressed air or other fluid under pressure delivered to its automatic actuating valve through pipe line 66 controlled by valve 67 provided with any suitable inlet for air or other fluid under pressure, this valve 67 also controlling the cope lifting cylinder 53 for raising and lowering it upon the stationary piston 52, the air being delivered to the cylinder 53 through pipe line 65 controlled by valve 67. In operation, the cope 60 rests upon the cope pattern on the cope jarring table 64. The cope is filled with sand and the table 64 jarred by actuating valve 67, the cope during the jarring movement reciprocating vertically between the arms 55 and 56. After sufficient jarring, the valve 67 is operated to cut off air supply in pipe line 66 and deliver a supply of air through pipe line 65 to cylinder 53 for the purpose of raising cylinder 53 on its piston 52 and thus raising the filled and packed cope 60 above the operating table 64. When the flask 60 has been raised, the cylinder 53 is rotated on the piston 52 to bring the cope over the assembling and transfer table 40, as shown in Fig. 1. The valve 67 is now actuated to lower the cope 60 for the purpose of depositing the cope mold 70 upon a drag mold 44.

Means are provided by the invention to insure absolute precision for this operation. These means include the drag machine guiding key and keyways, together with a similar guiding key and guiding keyways provided in the cope machine 50, all constructed, for example, in accordance with the disclosure of my copending application herein above referred to. The key and keyways insure that both drag and cope parts of the flask always descend in the same path upon their respective jarring tables; always rise through the same path above their respective jarring tables; always stop respectively in identical positions over the assembling and transfer table 40, and are always lowered through identically the same path down towards the assembling and transfer table 40.

It will thus be apparent that the drag molds 41 are successively deposited upon the transfer table, each at identically the same point, and that the cope molds are lowered upon the drag molds through identically the same path, and by the means hereinafter described the series of drags 41 are successively carried toward the cope machine 50 and are accurately and precisely positioned thereunder in order that the series of cope molds formed on the cope machine may be successively deposited with great precision each upon a drag mold positioned under the cope for that purpose.

Referring now particularly to the assembling and transfer table 40, the table illustrated in the drawings has been made of extremely short length for convenience in illustration. In practice, however, it will usually be convenient to make it considerably longer, so that it extends considerably beyond the cope machine 50 towards the right, as viewed in Fig. 1. A plurality of upwardly extending pairs of supporting brackets 75 are provided upon any suitable base 76 and carry at their upper ends a parallel pair of stationary top rails 77 (see Fig. 3). Secured to and extending inwardly and downwardly from the stationary rails 77 are oppositely disposed pairs of roller brackets 79 carrying at their inner ends grooved rollers 80.

Carried by the grooved rollers 80 and adapted to reciprocate horizontally thereon, are the parallel pair of lower traveling rails 83 connected to each other at spaced intervals by connecting and bracing rods 84.

Carried by the lower traveling rails 83 are a pair of upper traveling rails 90, which are at times adapted to be raised upwardly to extend higher than the stationary rails 77 and at times adapted to be lowered below the level of the upper edges of the stationary rails 77.

The upper movable rails 90 are connected by connecting and bracing rods 85, and these rods 85, together with the connecting and bracing rods 84, serve the additional purpose of securing means for the links 87, pivotally connecting the upper movable rails 90 with the lower movable rails 83.

The functions of the stationary rails 77, lower rails 83 and upper rails 90, referring now particularly to Figs. 6 to 9 inclusive, are as follows: Assuming the rails to be in the position shown in Fig. 6, that is, with the movable rails in their left-hand position and the upper rails 90 lowered to position slightly below the stationary rails 77, with a bottom board 30 carrying a drag flask 28 and drag mold 41, mechanism is provided for gradually raising the upper pair of movable rails 90, keeping them parallel at all times to the stationary rails 77 and lower movable rails 83. The upper movable rails 90 continue their gradual upward movement until they contact with the bottom board 30, lifting it and its drag mold off the stationary rails 77. The invention provides mechanism for now moving the rails 90 and 83 longitudinally or to the right, as viewed in Figs. 1 and 6 to 9, while maintaining the upper movable rails 90 in lifted position. It will be apparent that these movements, where a plurality of drags are supported on the stationary rails 90, as shown in Fig. 1, will cause first the lifting and then the moving longitudinally of all of these drag molds while maintaining them in precisely their same relative positions with respect to each other, that is, without disturbing the predetermined space between any two drag molds. At the end of the longitudinal movement towards the right, as viewed in the drawings, the upper rails 90 are gradually lowered below the stationary rails 77, thereby lowering the series of drag molds down upon the stationary rails 77 and bringing them all to a stop while precisely preserving their relative positions. With the upper rails 90 lowered to the position of Fig. 9, both movable rails are now carried toward the left with the upper rails 90 traveling longitudinally in their lowered position and thus passing freely under the stationary series of drag or other molds resting on the stationary rails 77. At the end of their travel toward the left, as viewed in the drawings, the rails 90 are again gradually lifted from the position of Fig. 6 to the position of Fig. 7, thereby lifting the molds off the stationary rails 77, and, repeating the movements above referred to, carrying them again towards the right, as viewed in the drawings, and at the same time accurately preserving their predetermined spaced relation with respect to each other.

The mechanism for producing the foregoing movements will now be described. A rotating crank 97, whose outer end 98 travels in the circular path indicated in dotted lines in Figs. 6 to 9 inclusive, is connected by a connecting rod 100 to one of the rods 85 connecting the upper movable rails 90. Assuming the crank 97 to be rotated in clockwise direction, as viewed in the drawings, in the position of Fig. 6, the movable rails have reached the limit of their movement toward the left, and continued rotation of the crank 97 in a clockwise direction thrusts the connecting rod 100 toward the left, and, the lower rails 83 being prevented from further movement towards the left by stops 102 against which they abut, the motion thus communicated to bracing rods 85 causes the upper rails 90 to ride on the links 87 slightly upwardly, bringing them, a shown in Fig. 7, to a position slightly higher than the stationary rails 77, this being the mold lifting movement. As the crank 97 rotates from the position of Fig. 7 to the position of Fig. 8, through nearly 180° of travel, the connecting rod 100 moves the bracing rod 85 towards the right while the upper rail 90 is maintained in lifted position by means hereinafter to be described, and since the upper rails are connected by links 87 to the lower rails, the lower rails 83 move to the right also. As the crank 97 rotates from the position of Fig. 8 to the position of Fig. 9, through a relatively short distance, the lower rails being in stationary position, the upper rails are drawn downwardly below the stationary rails 77, thereby depositing a series of molds on said stationary rails.

Referring now to Figs. 4 and 5, the upper rails 90 carry fixed thereto brackets 110, adapted at times to bear upon the cam surfaces of cams 111 pivoted at 112 to the lower rails 83, and adapted, when the upper rails 90 are in lowered position, to be clear of said cams. The lower rails 83 carry fixed thereto brackets 115, upon which the upper rails 90 are adapted to rest when in their lowered position. The lower rails 83 carry near their upper edges fixed cams 116, whose upper surfaces slope gradually upwardly and downwardly from left to right, as viewed in the drawings, and down which upper rail supporting rollers 117 are adapted to ride for the purpose of gradually lowering the upper rails below the stationary rails. The rollers 117 are carried at the lower ends of pivoted supports 118, which are pivoted, as at 119, to the upper rails 90. Adjacent the pivoted supports 118 is a supporting member 120 fixed to the upper rails 90 and adapted at times to rest upon the supporting portion 122 of the pivoted supports 118. A variably positionable abutment stop 124, located in the path of travel of the cam 111, is carried in a bracket 125 fixed to the supporting bracket 75, one on each side of the machine. It will be understood that some or all of this mechanism may be provided at both sides of the transfer table. Assuming the parts to be in the lifted position of Fig. 4, ready to travel towards the right for the purpose of moving a series of molds in that direction, the upper rails 90 are supported in raised position by cams 111 by means of the brackets 110, which rest on said cams. The cams are maintained in the position of Fig. 4 by springs 127 secured to the cams 111 and one of the connecting and bracing rods 84. In this relation to each other, the rails 90 and 83 are moved together towards the right by the connecting rod 100 and crank 97, already described, towards the position of Fig. 5. Referring to said figure, as the roller 117 approaches cam 116, it is thrown towards the left, as shown in Fig. 5, and contacts with the under side of the block 120 at the portion 122 of the pivoted supports 118, the roller 117 riding along the top surface of cam 116. As soon as the roller thus rests on the top surface of this cam, the cam 111 strikes the abutment 124, and as the rails continue moving towards the right, the cam 111 is moved in a clockwise direction, as viewed in the drawings, about its pivot 112, thus causing the supporting brackets 110 to ride downwardly on these cams as the cams rotate, the cam 111 at this time being under tension of the spring 127, but its lower end being held against further movement to the right by the stop 124. The cams 111 being thus rotated, they are moved clear of the supports 110 and the weight of the upper rails 90 is carried through blocks 120, rollers 117, and cam 116 on lower rails 83. As the movement of the rails continues towards the right, the rollers 117 ride downwardly on cams 116, this downward movement being very gradual, until the upper rails 90 rest on supporting brackets 115 of the lower rails. During this lowering movement of the upper rails, the series of molds has been deposited on the stationary rails 77, and the movable rails are now ready to be moved towards the left, as viewed in the drawings, with the upper rails 90 in their lowered position. As the crank 97 and connecting rod 100 begin their movement towards the left, the roller 117 strikes the right end of cam 116, and is moved in a counter-clockwise direction about its pivot 119, thus being carried idly over the cam 116 and dropping to the position of Fig. 4 after it leaves said cam. The thrust of the connecting rod 100 towards the left is exerted on rods 85 connecting the upper rails, and the weight of the upper rails, together with the fact that there is a minimum degree of friction on the lower rails due to the rollers 80, insures that the upper and lower rails will move together towards the left until the lower rails 83 abut against the stop 102, which prevents further movement on their part, and movement of the crank 97 from the position of Fig. 6 to the position of Fig. 7 causes the upper rails to continue their movement towards the left for a short distance and ride up on the links 87. Meanwhile the cam 111 has moved out of engagement with the stop 124, and its cam surface under tension of springs 127 bears against the under side of brackets 110. When the upward movement of the upper rails 90 takes place, as above described, and the supporting brackets 110 are lifted with respect to the cams 111, the cam surfaces maintain their contact with the under side of the brackets 110, under tension of the springs 127, and again assume the position of Fig. 4, thus supporting the upper rails in raised position, thereby causing them to lift the series of molds off the stationary rails 77 for another movement towards the right, as viewed in the drawings.

Certain mechanism is provided for rotating the crank 97, and this preferably includes the shaft 134 mounted in bearings 135 and being fixed at its outer end to the crank 97. The shaft 134 is rotated relatively slowly by a worm gear to which it is fixed, the worm gear being driven by a worm, both located in worm gear casing 139 and being of known construction. The worm gear mechanism is connected by a coupling 140 with a speed reducer 141, which may be gearing of known construction, and connected by coupling 142 with electric motor 143, with which is associated any suitable or commercial form of spring actuated solenoid brake 144 for the purpose of accurately stopping said motor and the parts connected therewith at the proper moment.

Referring now to Fig. 2, a limit switch 147 is provided at the end position of travel of the lower movable rails 83 and adapted to be opened by said rails as they reach the limit of their movement toward the right, as viewed in the drawings.

For operating this driving mechanism, a push button 150 is provided adapted to operate the relay 151 to start the driving mechanism in operation. The push button 150, relay 151, motor 143, spring actuated solenoid brake 144 and limit switch 147 are preferably connected as shown by the circuit diagram in Fig. 10.

Referring to the circuit diagram of Fig. 10, and assuming it is desired to operate the machine, the push button 150 is pressed momentarily, causing current to flow through relay 151. This causes switch 156 to close, throwing the motor 143 in circuit and releasing the solenoid brake 144, which, as shown, is in shunt with the motor circuit 159. The closing of the motor circuit by the relay 151 is also accompanied by the closing of the secondary circuit 160 by means of the same relay. In the secondary circuit 160 is located the limit switch 147. With the brake 144 released, the motor 143 thus starts driving through the mechanism above described, the crank arm 97, to operate the assembling and transfer table. If the traveling rails have been at the limit of their movement toward the right, as viewed in the drawings, the limit switch 147 closes as they begin to move towards the left, thereby providing a source of current to the relay 151 when the push button switch 150 is open. The assembly table mechanism travels through the cycle hereinabove described until the lower traveling bars 83 reach the limit of their movement towards the right, as viewed in the drawings, and contact with and open the limit switch 147. The relay 151 thereby becomes inoperative, and current to the motor 143 is cut off, and no current being delivered in the motor circuit, the solenoid brake 144 in shunt with said circuit operates by spring pressure to brake mechanism. This leaves the traveling part of the assembly table at the limit of its movement to the right, and when it is desired to start the mechanism again, the push button 150 is operated to repeat the movements and operations herein described.

It will be seen that the means and mechanism herein described provide for producing and handling completed molds ready for pouring, which can be operated continuously and accurately and with great rapidity, intermittent motion of the mechanism allowing for the accurate closing of the molds and at the same time allowing for the setting of any necessary cores when the molds are stationary.

The invention also provides means permitting the immediate use of the same cope for the making of another cope mold after it has deposited a cope mold on a drag, the drags being successively removed and pouring jackets slipped over the completed molds for pouring. The invention also provides means movable and positionable with great accuracy, any accidental contact with the drag molds causing shifting thereof being corrected by the flask guide pins as the mold is closed.

Various changes and modifications may be made in the mechanism hereinabove described without departing from the invention as defined in the following claims.

What is claimed is:

1. Apparatus for forming and handling molds, including drag mold forming mechanism, cope mold forming mechanism, an assembling and transfer table from said drag mold forming mechanism to said cope mold forming mechanism for intermittently moving a series of drag molds thereto, means for stopping said series and positioning the leading drag mold thereof with respect to said cope mold forming mechanism in position for having a cope mold accurately deposited thereon, and means for positioning a cope mold with respect to said leading drag mold and depositing said cope mold thereon.

2. Apparatus for forming and handling molds including drag mold forming mechanism, cope mold forming mechanism, an assembling and transfer table from said drag mold forming mechanism to said cope mold forming mechanism for intermittently moving a series of drag molds thereto, means for stopping and positioning said series of drag molds with the leading drag mold of said series under said cope mold forming mechanism in position for having a cope mold accurately deposited thereon, means for positioning a cope mold with respect to each of said drag molds in turn and for depositing a cope mold thereon, and means for stripping each deposited cope mold of its flask preparatory to pouring.

3. Apparatus for forming and handling molds, including drag mold forming mechanism, cope mold forming mechanism, an assembling and transfer table from said drag mold forming mechanism to said cope mold forming mechanism for successively delivering drag molds thereto, means for stopping and positioning said drag molds with respect to said cope mold forming mechanism in position for having cope molds accurately deposited thereon, and means included in said cope mold forming mechanism for positioning cope molds with respect to said drag molds and for depositing said cope molds accurately upon said drag molds.

4. Apparatus for forming and handling molds, including drag mold forming mechanism, cope mold forming mechanism, an assembling and transfer table from said drag mold forming mechanism to said cope mold forming mechanism for successively delivering drag molds thereto, means for stopping and positioning said drag molds with respect to said cope mold forming mechanism in position for having cope molds accurately deposited thereon, and means included in said cope mold forming mechanism for positioning cope molds with respect to said drag molds, depositing said cope molds accurately upon said drag molds and for stripping each cope mold of its flask.

5. Apparatus for forming and handling molds, including drag mold forming mechanism, cope mold forming mechanism, an assembling and transfer table from said drag mold forming mechanism to said cope mold forming mechanism for successively delivering drag molds thereto, means included in said drag mold forming mechanism for depositing a drag mold on said assembling and transfer table and for then drawing the drag pattern therefrom, means for moving said assembling and transfer table intermittently toward said cope mold forming mechanism, and for stopping the leading one of said drag molds in position, with respect to said cope mold forming mechanism, for having a cope mold accurately deposited thereon, and means included in said cope mold forming mechanism for positioning a cope mold with respect to said leading drag mold and for depositing said cope mold thereon.

6. Apparatus for forming and handling molds, including drag mold forming mechanism, cope mold forming mechanism, an assembly and transfer table from the former to the latter, and having stationary means to receive each of a successively formed series of drag molds from said drag mold forming mechanism, and having movable means for lifting said series of drag molds and conveying them in fixed spaced relation toward said cope mold forming mechanism and for depositing each of said series of drag molds in position with respect to said cope mold forming mechanism for having a cope mold deposited thereon.

In testimony whereof I affix my signature.

EDWARD HARMES.